Figure 1:
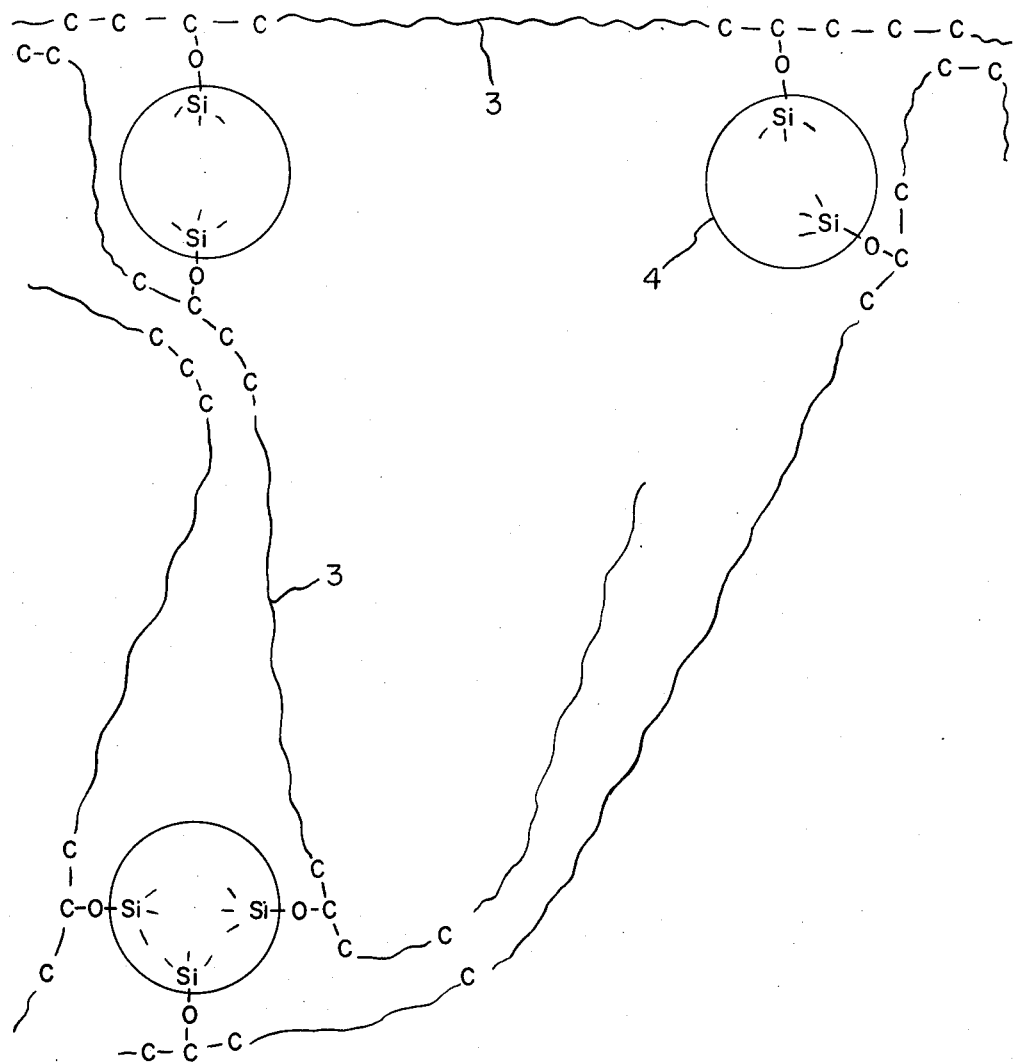

Oct. 30, 1962 R. D. PRUETT 3,061,577
PROCESS OF REACTING AN ORGANIC POLYMER WITH FINELY
DIVIDED SILICA AND RESULTING PRODUCT
Filed Aug. 6, 1956 5 Sheets-Sheet 1

INVENTOR
RICHARD DALE PRUETT

BY *A. Ralph Snyder*

ATTORNEY

Oct. 30, 1962  R. D. PRUETT  3,061,577
PROCESS OF REACTING AN ORGANIC POLYMER WITH FINELY
DIVIDED SILICA AND RESULTING PRODUCT
Filed Aug. 6, 1956  5 Sheets-Sheet 2

INVENTOR
RICHARD DALE PRUETT

BY

ATTORNEY

INVENTOR
RICHARD DALE PRUETT

ATTORNEY

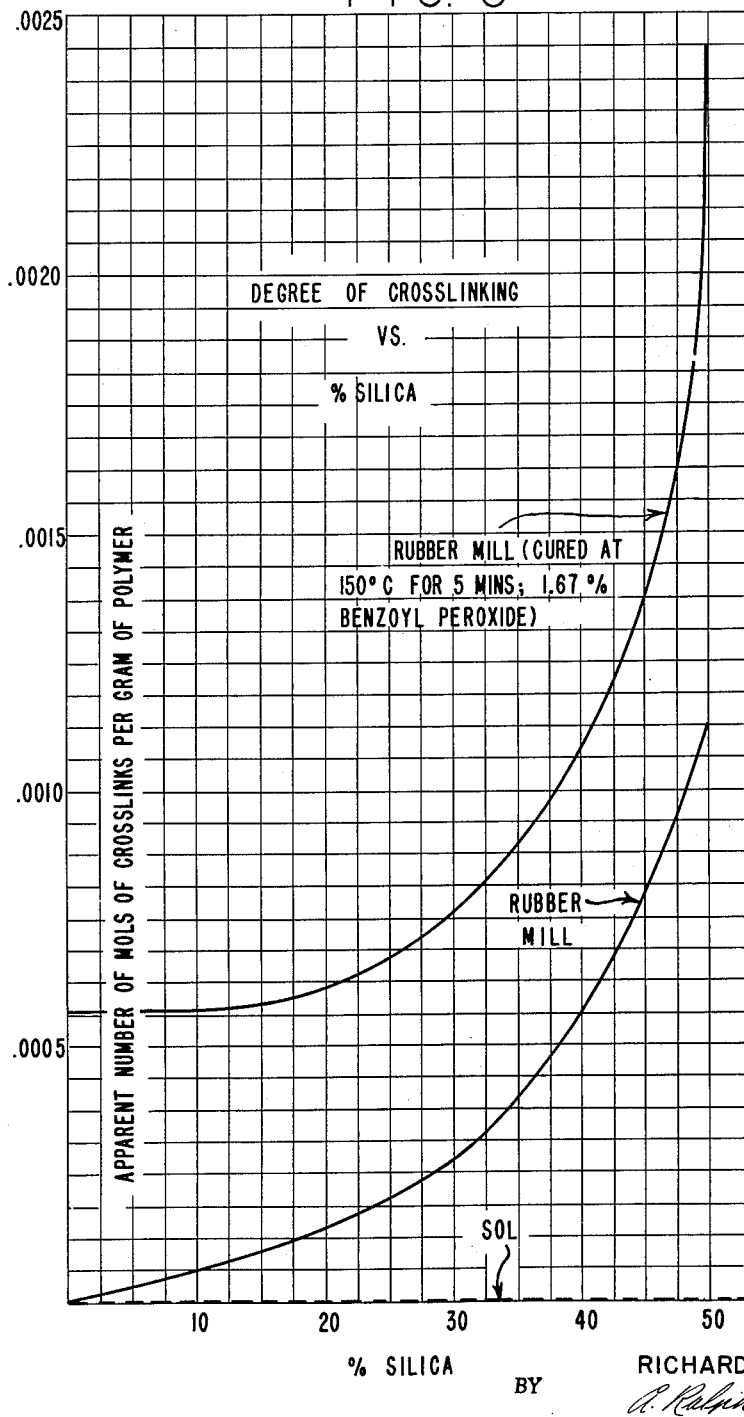

United States Patent Office 3,061,577
Patented Oct. 30, 1962

3,061,577
PROCESS OF REACTING AN ORGANIC POLYMER WITH FINELY DIVIDED SILICA AND RESULTING PRODUCT
Richard Dale Pruett, Eggertsville, N.Y., assignor to E. I. du Pont de Nemours and Company, Wilmington, Del., a corporation of Delaware
Filed Aug. 6, 1956, Ser. No. 602,398
20 Claims. (Cl. 260—41)

This invention relates to new compositions of matter and, more particularly, to polymeric products containing chemically combined siliceous material, methods for their preparation, films manufactured from these novel polymeric products and articles coated and laminated with them.

The use of siliceous particles in thermoplastic and thermosetting polymers to provide "reinforced" polymeric films, sheets, filaments and the like is known. In these applications, the siliceous particles are in mechanical admixture with the polymer, the polymer serving as a bonding material for the particles. Besides offering some beneficial effect upon certain physical properties of the polymeric material, the siliceous particles serve as a relatively inexpensive diluent, thus reducing the price of the reinforced product. However, the upper limit of the siliceous material that can be used in such mechanical mixtures without adversely affecting the physical properties of the product is low. The tensile strength, particularly, falls off sharply at relatively low concentrations of the siliceous particles. Chemical bonding of polymeric material and siliceous particles would seem to offer a more promising route to a product that would tolerate more siliceous particles without detracting from the physical properties of the product. However, the proper polymeric starting material, the useful siliceous material, the correct chemical combination of polymeric and siliceous materials and the means for effecting the combination have continued to elude workers in this field.

An object of the present invention is to provide polymeric products of outstanding properties in which the polymeric chains are chemically bonded to siliceous particles. Another object is to provide a cured polymeric product in which the chains are chemically bonded to siliceous particles. Further objects are to provide economical and effective processes for producing both the uncured and the cured polymeric products. Other objects will appear hereinafter.

The objects are accomplished by a polymeric material comprising a plurality of saturated organic polymeric chains, linked to each other through siliceous particles at a plurality of carbon atoms along each chain, the linking being effected by siloxy $$(i.e., -O-\overset{|}{\underset{|}{Si}}-)$$

linkages on the surface of the siliceous particles linked directly to carbon atoms in the polymeric chains.

Products of the invention can be prepared by processes which, in general, comprise contacting a saturated organic thermoplastic polymer with from 25% to 75%, based on the weight of the mixture, of finely-divided particles of siliceous material, the particles having a specific surface area of at least 100 square meters per gram and characterized by a surface coating of silanol $$(i.e., -\overset{|}{\underset{|}{Si}}-OH)$$

groups, the polymer characterized by a plurality of side groups attached to carbon atoms in the polymer chain, the carbon atoms being separated by at least two atoms in the chain, the side groups capable of condensation with silanol groups to effect complete removal of the side groups undergoing said condensation; heating the mixture while maintaining the components in intimate contact, preferably by the application of shear and compressive forces, e.g., a masticating action, to a temperature at least equal to the softening temperature of the polymer components of the mixture, for a time sufficient to effect removal of a substantial number of side groups from the polymeric chains and attachment of the chain to the siliceous particles; forming the flowable mixture into a structure; and cooling the structure thus formed.

FIGURE 1 of the drawings represents a two-dimensional concept of the product of the present invention. It should be noted that no effort has been made to make the scale even approximately correct. The sizes of silicon atoms, oxygen atoms and polymer chains are much smaller than the size of the siliceous particles. The siliceous particles are so large compared to the atoms and chains that there may be a multiplicity of chains linked to each siliceous particle. The figure illustrates the chemical structure of the product as evidenced by numerous experimental tests described hereinafter. The wavy lines in which are found the carbon atoms are the polymer chains 3. The chains are chemically bonded along the length to an inorganic siliceous solid 4, through a siloxy oxygen linkage, the oxygen lying between the silicon atom and the polymeric chain and illustrated by the conventional symbol

The inorganic siliceous solid may assume the form of a finely-divided powder, in which case the sphere (a circle in two dimensions) is typical of the particles.

Figure 2:
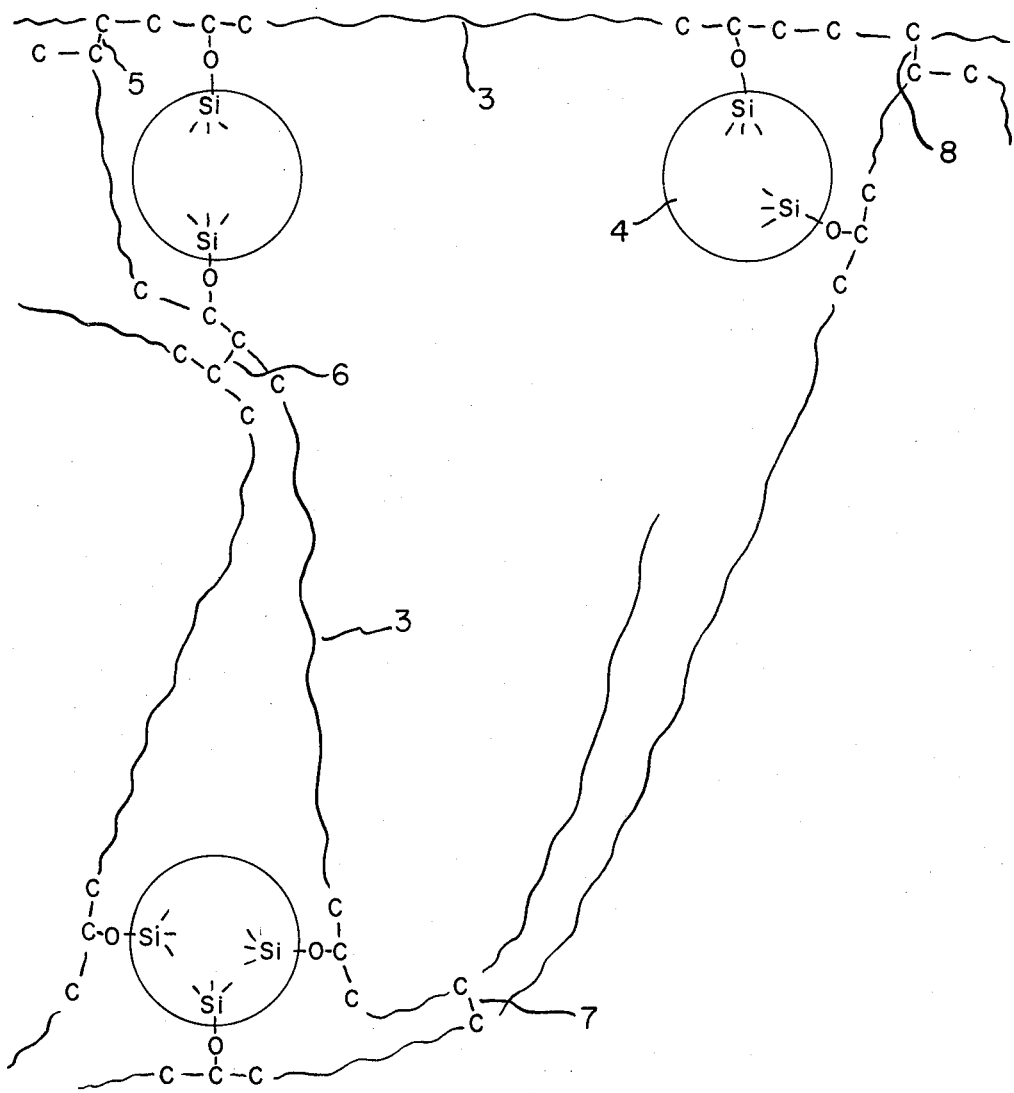

Another novel product of the present invention is shown in FIGURE 2. This product, the cured product, is obtained by subjecting the product shown in FIGURE 1 to conditions (curing) which cause additional linking of the polymeric chains (e.g., heating with or without the aid of curing agents). Thus, the polymeric chains 3 are not only chemically bonded along the length to inorganic siliceous particles 4, but are also bonded to each other through other types of linkages such as the carbon-to-carbon linkages illustrated at points 5, 6, 7 and 8.

The process of the invention is essentially a solid state reaction wherein at least one of a group of specific polymeric components is forced to flow around and past particles of certain useful siliceous materials in a shearing type of action. In the preferred procedure, from 25% to 75% of silica is milled with the polymer on hot rolls as in a rubber milling apparatus. The rolls are maintained at or above the softening temperature of the polymer. The temperature should be sufficiently high to retain the milled mass upon the rolls without excessive adherence of the mass to the rolls. The temperature, however, must be below that causing, in combination with the masticating action of the rubber mill, degradation of the polymer. During milling, the initially cloudy mixture is gradually transformed into a relatively transparent mass. This reaction, a chemical combination of silica and polymer, is usually accompanied by the evolution of vaporous by-products. The mass is then formed into a sheet or film by known expedients such as by calendering or rolling the mass into a sheet or film.

Although the technique of rubber milling is preferred, other techniques which bring about a similar type of mechanical action upon the mixed masses of the two components may likewise be employed to form a reaction mass which may then be formed into sheets, films, and similar type structures. The initial reactive components may be brought into intimate association in substantially solid form in various types of mixers which exert a masticating type of action upon the mass, and a typical type of mixer which may be employed is the Banbury. On the other hand, the initial dispersion of the silica particles into the polymer may be brought about by dispersing silica particles in a solution of polymer in a solvent. If the dispersion can then be maintained until the solvent is evaporated from the dispersion-solution, a residue of relatively uniformly dispersed silica particles in polymer is obtained in the form, in most cases, of a powdery material. This material may then be pressed under conditions of super atmospheric pressure and elevated temperatures to cause considerable flow of polymeric component and effect more intimate contact between the components. The resulting sheet may be substantially uniform at this stage, or it may be necessary to complete the formation of the sheet of polymer/silica reaction product by calendering or rolling the sheet at an elevated temperature.

Any other means or technique may be employed to bring about reaction between the subject components of this invention provided that the components are brought together under forces which bring about flow of the polymer, shearing forces between particulate silica and the polymer, and conditions of elevated temperatures and compressive forces. It is believed that the reactive components of this invention must be brought together under these conditions which provide for bringing relatively high concentrations of the individual components into intimate contact.

The cured products of this invention may be prepared by the use of heat, preferably in combination with a curing agent. The type of curing agent will depend upon the particular polymeric material reacted with silica.

Compounds capable of generating free radicals, such as benzoyl peroxide, tertiary-butyl perbenzoate, and other types of peroxides, are highly useful for effecting curing of the reaction products of copolymers of ethylene and vinyl acetate with particulate silica. The use of curing agents which generate free radicals normally effects further cross-linking of polymer chains in the form of single bonds between carbon atoms in different chains.

Other types of curing agents include basic oxides, such as zinc oxide, and such materials are preferred for curing reaction products of chlorosulfonated olefins and particulate silica.

On the other hand, curing may be effected by the use of agents which actually enter or form the complete link between different chains of the polymer/silica reaction product. Such types of curing agents include various isocyanates, such as toluene diisocyanate, and amines, such as triethylene tetramine.

THE SILICEOUS PARTICLES

Siliceous particles suitable for use in accordance with the present invention must meet two qualifications. Each particle must have a specific surface area (in relation to its mass) of at least 100 square meters per gram and a surface of silanol groups. The specific surface area of the siliceous particles may be determined by nitrogen adsorption. Since the nitrogen molecule has a diameter of less than 0.5 millimicron, it can penetrate essentially all the pores of siliceous particles useful in this invention, and the nitrogen is readily adsorbed by all of the exposed surfaces. A method for measuring specific surface areas by nitrogen adsorption is given in an article, "A New Method for Measuring Surface Areas of Finely Divided Materials and for Determining the Size of Particles," by P. H. Emmett, in the publication "Symposium on New Methods for Particle Size Determination in the Sub-Sieve Range," published by the American Society for Testing Materials, March 4, 1941, page 95. The particulate silica having a silanol surface may be illustrated by the following structural configuration:

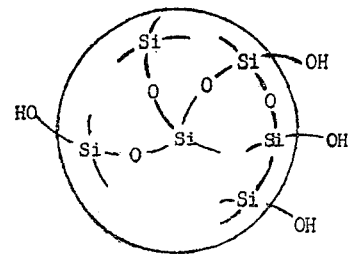

Such silica particles may be referred to in alternative terms: They may be referred to as hydrophilic silica, meaning that the material is wetted by water. On the other hand, the silica having a silanol surface, i.e., covered with a monolayer of hydroxyl groups, may be referred to as hydrated silica or a hydrated solid silicic acid or polysilicic acid, the monolayer of hydroxyl groups being called "bound water." According to Ralph K. Iler, in "The Colloid Chemistry of Silica and Silicates" (published 1955), when this type of silica is "heated to 500° C.–600° C., this layer (the monolayer of hydroxyl groups) is partly removed without sintering the silica; part of the surface is left in a dehydrated oxide condition which will not physically adsorb water or methyl red dye (as does the hydroxylated surface), but which can be slowly rehydrated upon exposure to water." Furthermore, Iler states that:

"(1) Physically adsorbed water is removed by drying to constant rate at 115° C.

"(2) Water remaining on silica gel at 115° C. is present as a layer of hydroxyl groups on the silica surface; this 'bound water' content is proportional to the surface area of the gel.

"(3) Water evolved between 115° C. and about 600° C. comes from dehydration of the surface hydroxyl groups, without appreciable loss in area of the silica surface.

"(4) Above 600° C. there is sintering with loss of silica surface and simultaneous loss of water, but the number of remaining hydroxyl groups per unit area remains constant."

The siliceous particles employed in forming the present products must be relatively non-porous unless the porosity of particles to be reacted with polymer is due to a state of aggregation which can be broken down during the proces of this invention to form discrete silica particles having a surface area of at least 100 square meters per gram. The particle size (size of the greatest dimension of a particle or the diameter in the case of spherical particles) of discrete, substantially non-porous silica particles is usually within the range from 0.001 micron to about 0.1 micron. Aggregates, which break down during the process of this invention, may be as large as 1 micron or greater.

The particles may be naturally formed or synthetically prepared in accordance with a variety of known techniques. The material may be entirely amorphous or contain a crystalline component. Although the preferred siliceous material is wholly amorphous falling within the class of materials known as colloidal silicas, the individual particles may be aggregates of discrete colloidal particles. In the case of dry colloidal particles of silica containing silanol surfaces, aggregation apparently always occurs owing to the spontaneous attraction between very small particles. According to Iler, "The main problem in making a useful finely-divided silica is to prevent the formation of such strong and compact aggregates that the individual or ultimate particles cannot later be separated." Hence during the process of intimately associating (by mechanical means) the polymer and the preferred types of silica, the supercolloidal aggregates break down into particles of colloidal size.

The following techniques are most useful for preparing siliceous particles for use in the present invention:

(1) A silica aerogel may be formed by gelling silicic acid in an alcohol-water solution and then converting the gel to an aerogel. This may be carried out by replacing most of the water of the gel with alcohol, heating the gel in an autoclave above the critical temperature of alcohol so that there is no meniscus between the liquid and gas phases and venting the vapors. In this way, the liquid phase is removed without subjecting the gelled structure to the compressive forces due to the surface tension of the liquid-gas interface. A pulverized light fluffy powder of silica particles may then be formed by pulverizing the dry aerogel.

(2) Colloidal silicas may be prepared by vaporizing silicon dioxide at high temperatures or producing silicon vapor by burning ethyl silicate or silicon tetrachloride and thereafter collecting the "silica fume."

(3) Still another technique of preparing colloidal silicas is to precipitate silica from aqueous solution in such form that it can be dried to give a fine powder.

It should be mentioned that it is difficult, if not impossible, in most cases, to reduce by mechanical means the particle size of hard naturally-occurring silicas, such as sand, to form smaller particles of satisfactory specific surface area.

The names of various types of available siliceous particles are specified in the following table, Table I. Only those marked by an asterisk are suitable in the present invention.

*Table I*

| Name | Ultimate particle size, microns | Specific surface area, m.²/g. |
|---|---|---|
| "Celite" | Over 1 | 20 |
| *"Hi-Sil" | 0.025 | 110 |
| *Aerosil | 0.004-0.020 | 300-350 |
| *Aerosil | 0.015-0.020 | 175-200 |
| *"Syloid" 244 | (¹) | 290 |
| "Valron" Estersil | 0.008-0.010 | 275-325 |
| *"Cab-O-Sil" | 0.015-0.022 | 175-200 |
| "Superfloss" | 2-4 | 20-25 |

¹ Aggregates break down to form ultimate particles having a specific surface area of about 290 m.²/g. or greater.

SATURATED ORGANIC POLYMERS

As the polymeric component of this invention there may be employed any saturated organic polymer containing a plurality of functional side groups directly attached to carbon atoms in the polymer chain, said carbon atoms being separated by at least two atoms in the chain, said side groups being capable of condensation with silanol groups under the defined conditions of intimate association (e.g., rubber-milling) and heat to effect complete removal of said side groups undergoing said condensation and to form chemical bonds of the type $$-\underset{|}{\overset{|}{\text{Si}}}-\text{O}-\text{C}-$$

wherein the carbon atom is in the polymer chain. Specific examples of polymeric materials meeting these specifications include copolymers of ethylene and vinyl acetate, polyvinyl butyral, chlorosulfonated polyethylene, and copolymers of ethylene and vinyl salicylate. These particular polymeric materials contain side groups which are specific examples of functional radicals which are reactable with silanol groups under the conditions of the reaction of the present invention. These side groups are —OH,

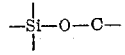

and —SO₂X, where R is alkyl, aryl, aralkyl or substituted alkyl, aryl or aralkyl radicals, and X is halogen. Preferably, R is an alkyl radical containing up to four carbon atoms. It is also preferred that the remaining valence of each chain carbon atom, to which a reactive side group is attached, be satisfied by a monovalent element, such as H or F. Examples of classes of compounds which are reactable with particulate silicas according to the process of the present invention include various modified saturated hydrocarbons as chlorosulfonated polyethylene, copolymers of various ethylenically unsaturated hydrocarbons with copolymerizable compounds having reactive side groups, such as copolymers of ethylene and vinyl acetate, isobutylene and vinyl acetate, ethylene and vinyl salicylate, tetrafluoroethylene and vinyl acetate, and chlorotrifluoroethylene and vinyl acetate, polyvinyl acetals including polyvinyl formal and polyvinyl butyral.

Whereas the elevation of the physical properties of the polymer/silica reaction products of the present invention is highly surprising and is the basis of the present invention, the physical properties of all of the various types of polymer/silica products within the scope of this invention are not all enhanced to the same degree. Furthermore, the products obtainable by the present invention are useful in different types of end use applications. For example, some of the polymer/silica products are soft and highly flexible, while others are relatively hard and tough. One class of useful products of the soft, flexible type are those formed by reacting silica with copolymers of ethylene and vinyl acetate. Films prepared from these products are soft and flexible, and they have characteristics similar to the commercially available plasticized vinyl films. Silica particles can be reacted with various ethylene/vinyl acetate copolymers wherein the mole ratio of ethylene to vinyl acetate has been set at such values as 1/1, 2.6/1, 4/1, 4.2/1, 4.8/1, 5/1 and higher. The reaction between ethylene/vinyl acetate copolymers and particulate silica which is a typical reaction of this invention may be represented by the following:

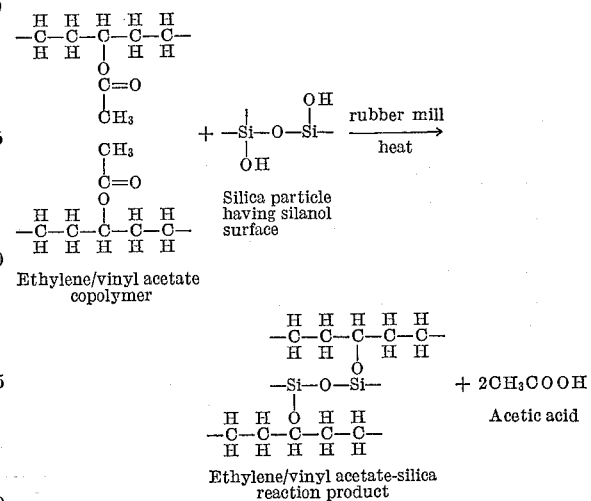

When the above reaction is carried out on a rubber mill (roll temperature at about 80° C.) the odor of the evolved acetic acid is readily detectable, and this by-product has been collected, measured and identified as will be described in more detail hereinafter. The milled mass may then be readily calendered into the form of a thin transparent film having an unusual combination of enhanced physical properties (compared with unmodified polymer or polymer merely filled with a particulate material not chemically bonded to it). The physical properties of these films will be discussed in greater detail hereinafter.

EXAMPLES

The following examples illustrate the preparation and physical properties of reaction products of silica and copolymers of ethylene and vinyl acetate. Under all circumstances, unless otherwise specified, the reaction was carried out by milling the polymer and silica particles together on a rubber mill having steam heated rolls heated to a temperature within the range from 80° C.–135° C. The polymer was initially added to the hot, stainless steel rolls, and then the silica particles were slowly fed to the milling polymer. The total time of milling was maintained within a duration of about 7–20 minutes. Ethylene/vinyl acetate copolymers of varying mole ratios of ethylene to vinyl acetate were milled with silica, and in each case a control film was prepared by rubber milling each polymer composition with no silica.

Film was formed from the reaction products in accordance with several different techniques: (1) Melt-pressing—in some cases a film was formed by melt-pressing a rubber-milled (in rubber-milling the rolls are normally operating at different peripheral speeds) mass of polymer and silica particles in a press between ferrotype plates at a temperature of about 110° C. for 10 minutes. The film was cooled under pressure before removing it from plates at room temperature. (2) Mill-rolling—some films were formed on the rolling mill (in a rolling mill the rolls are normally operating at the same peripheral speed) by cutting squares of material from a thick sheet obtained from the rubber-milling operation, and thereafter passing these thicker sheets through a reduced nip between mill rolls several times to obtain a film of the desired thickness. (3) Calendering—after rubber-milling the components together the mass of reaction product was calendered into film form on a calendering apparatus.

In a series of examples (Table II), 45% by weight of different types of commercial silica particles, based upon the total weight of silica and polymer, was rubber-milled with an ethylene/vinyl acetate copolymer (4/1 mol ratio) under the conditions specified above, and films of equivalent thicknesses (average thickness of 20 mils) were fabricated by melt-pressing between ferrotype plates at a temperature of 110° C. for 10 minutes under a pressure of at least 400 p.s.i.

These commercially prepared silicas varied with respect to particle size and specific surface area, and this series of experiments illustrates the negative effect of utilizing silica particles having low specific surface areas (less than about 100 m.$^2$/g.) upon such physical properties as tensile strength, tear strength and zero strength temperature. Even though only little chemical reaction is effected between the silica and polymer when silica particles of low specific surface area are employed, the initial tensile modulus of film formed from the resulting product will increase as is normally the case when solid filler materials are added to a thermoplastic polymer. The physical properties of films formed from the various reaction products are summarized in Table II. It should be indicated that the estersils employed in these examples are defined in U.S.P. 2,657,149 (R. K. Iler—assigned to Du Pont). In brief, these estersils are super-colloidal siliceous substrates coated with —OR groups, where R is a hydrocarbon radical of at least 2 carbon atoms and wherein the carbon atom attached to oxygen is also attached to hydrogen, and the substrate has a specific surface area of at least 1 m.$^2$/g. The estersils are not useful in forming the reaction products of the present invention because the products are substantially chemically hydrophobic in that any silanol groups left on the silica surface are not reactive, i.e., they are sterically hindered by the great number of —OR groups forming the surface. These estersils, however, may be stripped of their —OR coating by treatment at greatly elevated temperatures, and the original silanol surface can be substantially reformed. It is this product which is referred to as "stripped" estersil in Table II.

The physical properties of the films of this invention were measured in accordance with the following:

*Tensile strength.*—The tensile strength of the present film structures is based upon the initial cross-sectional area of the sample. Tensile strength at break is determined by elongating the film sample at a rate of 100% per minute until the film sample breaks.

*Elongation.*—The value of elongation represents the extent to which the film is extended at breakage. Elongation is effected at the rate of 100% per minute.

*Initial tensile modulus.*—Initial tensile modulus is a measure of film stiffness, i.e., the higher the modulus the greater the stiffness. Modulus is taken from the slope of the initial or Hookian portion of the stress-strain curve at 1% elongation, the film being elongated at the rate of 100% per minute.

*Zero strength temperature.*—The zero strength temperature is that temperature at which a film supports a load of 20 lbs./sq. inch per film cross-sectional area for no more or less than 5±0.5 seconds. The test is carried out by placing the sample in contact with a heated bar, the proper load being previously applied, and determining the length of time required for failure. This is carried out at various temperatures until the zero strength temperature is determined.

*Initial permeability value.*—The water vapor permeability (initial permeability value—IPV) is carried out in accordance with the test described in United States Patent 2,147,180 to R. T. Ubben.

*Tear strength.*—In the measure of tear strength, the specimens used in this test are 2″ x 2½″. An initial cut of 1″ in length is made in the lengthwise direction. The specimen is placed between jaws which separate at the rate of 10″/minute. The maximum force required to continue the above initial tear for an additional 1½″ is recorded. This maximum force is then divided by the sample thickness to give tear strength in grams/mil.

*Table II*

| Ex. | Type of silica | Ultimate particle size, microns | Specific surface area, m.$^2$/g. | Tensile strength, p.s.i. | Elong., percent | Modulus, p.s.i. | Tear strength g./mil | Zero strength temp., ° C. |
| --- | --- | --- | --- | --- | --- | --- | --- | --- |
| 1 | Control | | | 1,600 | 1,680 | 500 | 51 | 100 |
| 2 | "Superfloss" | 2–4 | 20–25 | 509 | 680 | 5,170 | 146 | 250 |
| 3 | "Celite" 270 | 2–4 | 20–25 | 1,030 | 1,010 | 48,200 | 46 | 147 |
| 4 | "Celite" 220 | 2–4 | 20–25 | 528 | 444 | 7,430 | 191 | 125 |
| 5 | "Hi-Sil" 101 | 0.03 | 160 | 3,575 | 460 | 10,000 | 270 | >300 |
| 6 | "Cab-O-Sil" | 0.015–0.022 | 175–200 | 3,375 | 443 | 10,100 | 333 | >300 |
| 7 | "Syloid" 244 | $^1$3.3 | 292 | 4,000 | 335 | 31,000 | 275 | >300 |
| 8 | "Valron" Estersil | 0.008–0.010 | 275–325 | 1,050 | 820 | 3,700 | 168 | 115 |
| 9 | Stripped "Valron" | 0.008–0.010 | 275–325 | 2,050 | 146 | 38,715 | 93 | >200 |

$^1$ 3.3 microns is the original size of particle prior to milling.

The following series of examples illustrate reacting the same amount of particulate silica (45% by weight of "Cab-O-Sil") with different ethylene/vinyl acetate copolymers wherein the mole ratio of ethylene/vinyl acetate is at 1/1, 2.6/1, 4.2/1, 4.8/1 and 5/1. In general, the tensile strength increases as the amount of the ethylene component increases. The physical measurements were made on film (having an average thickness of 7 mils) prepared from a polymer/silica product which was rubber milled within a temperature range of 80° C.–135° C. for a period of from 7–20 minutes. The results are summarized in Table III.

*Table III*
EFFECT OF MOLE RATIO OF E/VA

| Ex. | Mole ratio | Percent $SiO_2$ | Tenacity p.s.i. | Elongation, percent | Modulus, p.s.i. | Tear, g./mil | Zero strength temperature, °C. |
|---|---|---|---|---|---|---|---|
| 10 | 1/1 | 0 | 289 | 343 | 117 | 26 | >60 |
|    |     | 45 | 270 | 1,242 | 1,747 | 93 | 300 |
| 11 | 2.6/1 | 0 | 18 | 1,270 | 300 | 45 | 60 |
|    |     | 45 | 1,320 | 162 | 37,300 | 180 | >300 |
| 12 | 4.2/1 | 0 | 1,600 | 1,680 | 500 | 51 | <100 |
|    |     | 45 | 2,640 | 703 | 17,000 | 302 | >300 |
| 13 | 4.8/1 | 0 | 1,500 | 1,000 | 2,700 | 64 | 175 |
|    |     | 45 | 3,700 | 650 | 31,200 | 381 | >200 |
| 14 | 5/1 | 0 | 1,886 | 850 | 1,390 | 83 | 66 |
|    |     | 40 | 5,200 | 324 | 21,800 | 456 | >300 |

The following series of examples illustrates reacting varying quantities of the same type of silica particles ("Cab-O-Sil") with ethylene/vinyl acetate copolymers wherein the mol ratio of ethylene/vinyl acetate is varied (i.e., 2.6/1, 4.2/1 and 6/1). The examples indicate the physical properties of these ethylene/vinyl acetate copolymers containing different amounts of silica, and the data are summarized in Table IIIA.

weak jelly-like films which are useless as fabric-replacement materials. It is, therefore, highly surprising and unexpected that chemical combination of a substantially equal weight of silica particles and these ethylene/vinyl acetate copolymers forms a product capable of being formed into films which not only possess a unique combination of improved strength properties, but are highly transparent. At the most, it would only be expected that incorporation of such a particulate material would lead to producing a product formable into a somewhat stiffer film, as evidenced by an increase in initial tensile modulus, but there was little expectation of an improvement in such properties as tensile strength, zero strength temperature, tear strength and solvent resistance.

The following example illustrates an alternative procedure for bringing about intimate contact between a polymer and particulate silica to form a reaction product of the present invention.

*Example 37.*—A copolymer of ethylene and vinyl acetate (mol ratio of 5/1) (60 parts) was added to toluene, and 40 parts of silica particles ("Cab-O-Sil") was added to the solution with agitation, and the solution-dispersion was agitated for ½ hour at 100° C. The solution-dispersion was then heated to 110° C. to evaporate the solvent, and a residue of a white powdery material remained. This powder was then heated at 150° C. for 1 hour, and thereafter melt-pressed between ferro-type

*Table IIIA*

| Example | Mole ratio of E/VA | Weight percent silica "Cab-O-Sil" | Film formation | Film thickness, mils | Tensile strength | | | Elongation | | | Modulus | | | Tear strength, mil | | | Zero strength temp. °C. |
|---|---|---|---|---|---|---|---|---|---|---|---|---|---|---|---|---|---|
| | | | | | MD | P.s.i. | TD | MD | Percent | TD | MD | P.s.i. | TD | MD | g./mil | TD | |
| 15 (control) | 6/1 | 0 | MP | 10 | | 1,500 | | | 1,000 | | | 2,700 | | | 64 | | 175 |
| 16 | 6/1 | 20 | MP | | | 2,400 | | | 1,100 | | | 5,300 | | | | | |
| 17 | 6/1 | 30 | MP | 16 | | 3,000 | | | 1,150 | | | 8,700 | | | 284 | | 150 |
| 18 | 6/1 | 40 | MP | | | 3,200 | | | 730 | | | 24,300 | | | | | |
| 19 | 6/1 | 45 | MP | 34 | | 3,700 | | | 650 | | | 31,200 | | | 381 | | 300 |
| 20 | 6/1 | 50 | MP | 19 | | 3,000 | | | 470 | | | 38,600 | | | 200 | | 300 |
| 21 | 6/1 | 60 | MP | 28 | | 2,500 | | | 95 | | | 75,000 | | | 27 | | 300 |
| 22 (control) | 4.2/1 | 0 | SC | | | 1,800 | | | 850 | | | 580 | | | 21 | | |
| 23 (control) | 4.2/1 | 0 | MP | 6 | | 1,600 | | | 1,680 | | | 500 | | | 191 | | 100 |
| 24 | 4.2/1 | 30 | MP | 10 | | 2,450 | | | 1,220 | | | 2,900 | | | 251 | | 300 |
| 25 | 4.2/1 | 40 | MP | 30 | | 2,300 | | | 745 | | | 7,500 | | | 302 | | 300 |
| 26 | 4.2/1 | 45 | MP | 32 | | 2,640 | | | 703 | | | 17,000 | | | 445 | | 300 |
| 27 | 4.2/1 | 50 | MP | 37 | | 2,000 | | | 433 | | | 24,200 | | | 322 | | 300 |
| 28 | 4.2/1 | 55 | MP | 28 | | 2,000 | | | 280 | | | 34,200 | | | 151 | | 300 |
| 29 | 4.2/1 | 60 | MP | 35 | | 2,100 | | | 8 | | | 39,000 | | | | | 300 |
| 30 | 4.2/1 | 45 | MR | 9 | 5,000 | | 1,750 | 257 | | 630 | 10,068 | | 10,130 | 338 | | 328 | 300 |
| 31 | 4.2/1 | 55 | MR | 9 | 4,180 | | 1,700 | 150 | | 470 | 22,000 | | 29,000 | 6 | | 300 | 300 |
| 32 | 4.2/1 | 60 | MR | 10 | 5,270 | | 2,050 | 150 | | 400 | 31,600 | | 31,900 | 52 | | 212 | 300 |
| 33 (control) | 2.6/1 | 0 | MP | 12 | | 18 | | | 1,270 | | | 300 | | | 45 | | 60 |
| 34 | 2.6/1 | 30 | MP | 26 | | | | | 880 | | | 5,500 | | | 80 | | 276 |
| 35 | 2.6/1 | 45 | MR | 11 | 1,800 | | 840 | 109 | | 216 | 33,600 | | 41,000 | 23 | | 136 | 300 |
| 36 | 2.6/1 | 60 | MR | 10 | 3,670 | | 1,325 | 65 | | 80 | 75,400 | | 84,800 | 11 | | 200 | 300 |

NOTE.—MP—Melt-pressed; SC—Solvent-cast; MR—Mill-rolled; MD—Machine direction (direction in which the film was mill-rolled); TD—Transverse direction.

Films and sheets formed from the reaction products of silica with ethylene/vinyl acetate copolymers have a unique combination of physical properties for use as fabric-replacement films. These films are highly useful in such applications as indoor and outdoor upholstery applications, for conversion into various articles of clothing such as rainwear, windbreakers, and shoe coverings, and in such general applications as drapery material, shower curtains, inflatable toys, inflatable swimming pools, and the like, and a myriad of other end uses where the well-known vinyl type films are employed in present-day markets. The uniqueness of films and sheets formed from the present reaction products of silica with copolymers of ethylene and vinyl acetate should be emphasized in view of the fact that they need no plasticizing compositions and yet they possess the flexibility and hand of thermoplastic films which require plasticization to attain flexibility. It should further be emphasized that unmodified ethylene/vinyl acetate copolymers (containing no chemically combined silica) form relatively plates at a temperature of 150° C. for 15 minutes. The resulting film was substantially clear with a few opaque areas, which were readily removed by rolling the film through two closely spaced metal rolls heated to about 38° C. The resulting film exhibited a substantial increase in tensile strength, initial tensile modulus, tear-strength and zero strength temperature over a film formed by a similar process except that no silica was introduced.

*Example 38.*—This example is presented to show that

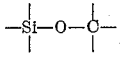

bonds in the polymer/silica reaction products of the present invention are substantially unaffected by the following type of acid hydrolysis.

An ethylene/vinyl acetate copolymer (mol ratio of 5/1) was rubber-milled at 90° C. for 10 minutes with 45% by weight, based on the total weight of polymer and silica, of "Cab-O-Sil." A sample of the resulting polymer/silica product (10.0000 grams) was placed in 500 milliliters of refluxing toluene for 48 hours. The remaining insoluble solid was isolated by centrifugation. and dried at 65° C. in a vacuum oven. The amount of insoluble solids isolated weighed 5.7486 grams. A small sample of the isolated solid (0.3955 gram) was placed in a weighed crucible and charred at 1000° C. for 48 hours. The silica which remained weighed 0.2721 gram. Therefore, the weight of polymer attached to silica in the insoluble product isolated by centrifugation was 31.2%.

Another sample of the insoluble solids from the toluene extraction (2.5079 grams of material) was placed in a flask containing 0.1 N hydrochloric acid, and the acid was the polymer-silica reaction product exhibited an appreciable increase in tensile strength and zero strength temperature over a control film prepared from the unmodified polymer. Furthermore, the unmodified material was completely soluble in selected solvents whereas the polymer/silica reaction product exhibited a highly increased solvent resistance to the same solvents. The particulate silica employed in these examples was "Cab-O-Sil" which has an ultimate particle size in the neighborhood of 0.015–0.022 micron and a specific surface area within the range from 175–200 m.$^2$/g.

Table IV

| Ex. | Polymer | Percent SiO$^2$ | Tenacity, p.s.i. | Elongation, percent | Modulus, p.s.i. | Tear, g./mil | Zero strength temperature, °C. |
|---|---|---|---|---|---|---|---|
| 40 | Polyvinyl butyral [1] | 0 | 5,360 | 2.5 | 299,400 | 46 | 160 |
|    |                       | 45 | 7,100 | 4.5 | 401,200 | 27 | 250 |
| 41 | Chlorosulfonated polyethylene | 0 | 162 | 829 | 262 | 61 | 140 |
|    |                               | 45 | 446 | 445 | 15,024 | 128 | 300 |
| 42 | Hydrolyzed ethylene/vinyl acetate copolymer (2.6/1) | 0 | 2,740 | 55 | 132,000 | 120 | 120 |
|    |                                                    | 45 | 5,560 | 9 | 236,400 | 250 | 250 |
| 43 | E/VS (4/1) | 0 | 2,125 | 430 | 2,800 | 85 | 200 |
|    |            | 45 | 7,088 | 150 | 30,680 | 12 | 300 |
| 44 | VCl/VA (4/1) | 40 | 2,400 | 296 | 12,000 | 20 | 200 |

[1] Polyvinyl butyral (17–21 weight percent vinyl alcohol).
NOTE.—VS—vinyl salicylate; E—ethylene; VA—vinyl acetate; VCl—vinyl chloride.

refluxed for 48 hours. The remaining insoluble solid was isolated by centrifugation, and washed with distilled water until neutral. Thereafter, the solid was dried in a vacuum oven at 60° C. and the residue was found to weigh 2.4650 grams. This solid material was then placed in toluene and refluxed for 48 hours as described above. The solids remaining were isolated and dried as described above. A smaller sample of this solid material (0.3579 gram) was charred in a crucible in a manner described above, and the weight of silica remaining was 0.2743 gram. This indicated that the insoluble solid material contained 23.4% polymer.

The following series of examples are presented to illustrate the pertinent physical property data obtained from films by reacting other types of polymers within the scope of the present invention with particulate silica on a rubber mill under temperature conditions required to retain a coherent mass of silica and polymer upon the rubber milling rolls and to facilitate intimate association between the flowable viscous polymer and the particulate silica. In general, for ethylene/vinyl acetate copolymers, rubber-milling is carried out within the range from 80° C.–135° C., 100° C.–150° C. for polyvinyl butyral, 50° C.–100° C. for chlorosulfonated polyethylene, about 120° C. for hydrolyzed ethylene/vinyl acetate copolymer. The time of the rubber-milling was within the range of about 7–20 minutes. The films were formed by melt-pressing. In every case, as shown in Table IV, film prepared from In a manner similar to those examples indicated in Table III, other types of linear thermoplastic film-forming polymers containing no side groups reactable with silanols were rubber-milled with particulate silica, and films formed from the resulting compositions exhibited no unexpected increase in tensile strength, zero strength temperature, or insolubility in a good solvent for the polymer containing no silica. Among these polymers which behaved in this manner are polyethylene, polyisobutylene, polyhexamethylene adipamide, polyethylene sebacamide, plasticized polyvinylidene chloride and a polyester derived from ethylene glycol, terephthalic acid and sebacic acid.

The following series of examples illustrates the improvement in properties resulting from press-curing film prepared as hereinabove described.

The components were rubber-milled at 80° C.–90° C., and formed into film by calendering the rubber-milled material. Where the products were to be cured, the curing agent was incorporated in the polymer/silica mixture during rubber-milling. Table V summarizes the pertinent conditions and properties of the resulting film.

Table V

| Ex. | Polymer | Percent silica ("Hi-Sil" 233) | Curing Catalyst | Temp., °C. | Time, (minutes) | Tensile strength, p.s.i. | Elong., percent | Modulus, p.s.i. | Tear, g./mil | Zero strength temperature, °C. |
|---|---|---|---|---|---|---|---|---|---|---|
| 44 | E/VA (4/1) |    |                       |     |   | 356   |     | 204    |     | 48 |
| 45 | E/VA (4/1) |    | 4% benzoyl peroxide   | 130 | 2 | 795   |     | 246    |     | >300 |
| 46 | E/VA (4/1) | 45 |                       |     |   | 970   |     | 1,765  |     | >300 |
| 47 | E/VA (4/1) | 45 | 2% benzoyl peroxide   | 130 | 2 | 2,400 |     | 2,943  |     | >300 |
| 48 | E/VA (4/1) | 39 |                       |     |   | 970   | 770 | 1,763  | 122 |    |
| 49 | E/VA (4/1) | 39 | 1% tert-butyl perbenzoate | 170 | 5 | 2,669 | 802 | 2,989 | 167 |    |
| 50 | E/VA (4/1) | 39 | 1% tert-butyl peracetate | 170 | 5 | 1,251 | 859 | 4,011 | 106 |    |
| 51 | E/VA (4/1) | 39 | 1% benzoyl peroxide   | 140 | 5 | 2,324 | 665 | 4,018 | 151 |    |
| 52 | E/VA (2.6/1) | 45 |                     |     |   | 1,330 | 163 | 37,250 | 180 |    |
| 53 | E/VA (2.6/1) | 39 | 1% benzoyl peroxide | 140 | 2 | 2,030 | 770 | 14,400 | 245 |    |

*Example 54.*—Following the procedure of the preceding examples, a composition consisting of 68% ethylene/vinyl acetate (4/1) copolymer, 30% "Hi-Sil," 1% ferric oxide pigment, and 1% benzoyl peroxide was rubber-milled at a temperature of 80° C. and the milled product was pressed into a sheet at a temperature of 160° C. and cured for 15 minutes. The cured film had a tensile strength of 1800 p.s.i., an elongation of 1050% and a Shore hardness of 70. The same film subjected to a temperature of 200° C. under 60,000 pounds pressure for 2 hours had a tensile strength of 2050 p.s.i., an elongation of 700% and a hardness by the Shore test of 75. This severe treatment demonstrates that the polymer/silica product does not degrade under these conditions.

The polymer-silica products of the present invention are, as described hereinbefore, composed of polymer chanis cross-linked through silica particles. The cross-linked polymer is characterized by having a plurality of siliceous particles chemically bonded to individual polymer chains directly through —O—Si— linkages, and a substantial number of said polymer chains being bonded through like linkages and through said particles to more than one other polymer chain. A diagram of a small section of this structure has been presented hereinbefore. The following series of examples wherein various types of silica/ethylene-vinyl acetate copolymer products have been made by the process of this invention and by techniques of the prior art demonstrate that the present process brings about a chemical reaction between polymer and silica and that this chemical reaction results in forming cross-linkages between polymer chains.

Figure 3:
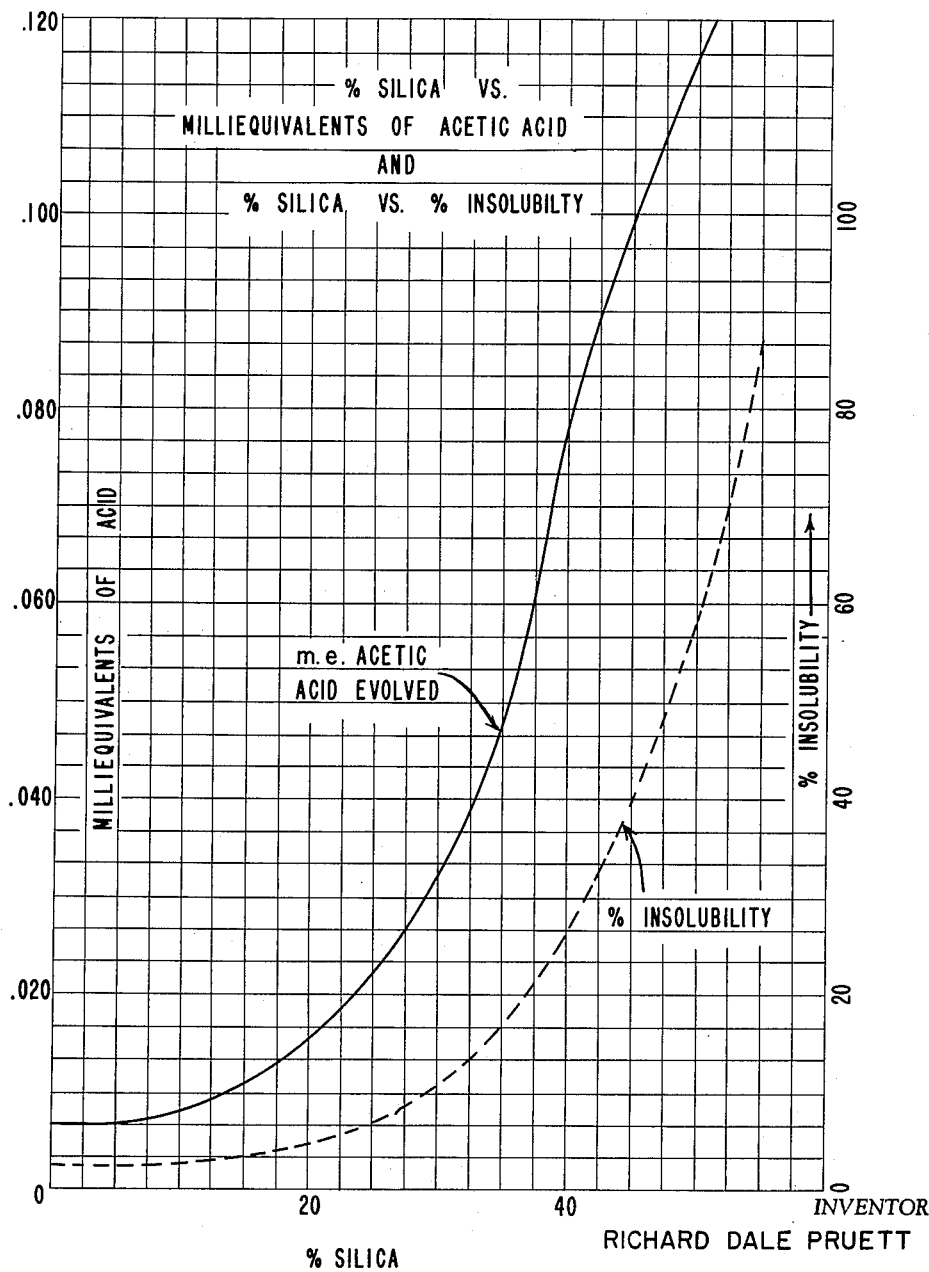

In a series of examples, an ethylene/vinyl acetate copolymer (5/1 mol ratio) was rubber-milled with various amounts of particulate silica ("Cab-O-Sil") at 85° C. Vapors of acetic acid, which were evolved during the milling process, were drawn in through a series of traps and cooled in a Dry Ice-acetone bath. The amount of acetic acid collected was determined by titration with a standard 0.1 N sodium hydroxide solution after milling a definite amount of silica with the same amount of the ethylene/vinyl acetate copolymer. FIGURE 3 clearly shows the increased amount of acetic acid evolved during the milling action as products containing greater amounts of silica are prepared by rubber milling.

In a similar series of examples, an ethylene/vinyl acetate copolymer (5/1 mol ratio) was milled with various quantities of silica ("Cab-O-Sil") under the same conditions described above, and polymer/silica products containing different weights of silica were prepared. Small samples of each of the various products containing different weights of silica were then prepared for determination of the weight of insoluble material in the polymer in accordance with the following procedure:

Into a 3-neck round-bottomed flask fitted with a reflux condenser and a stirrer were placed 1.5000 grams of finely divided polymer/silica product and 50 milliliters of dry solvent. The solvent used was one which was considered to be excellent for the unmodified polymer, for example, toluene was employed in the case of ethylene/vinyl acetate copolymers, and ethanol was employed for polyvinyl butyral. Refluxing and stirring were continued for 48 hours. The mixture, composed of a solution of the dissolved polymer and undissolved particles suspended in the solution, was cooled to 50° C.–60° C. and placed in tubes and centrifuged at 3180 r.p.m. in an International Chemical centrifuge Model CL.

The resulting solutions of dissolved polymer containing undissolved particles suspended therein was then subjected to 3 different tests carried out as follows:

*Rate of sedimentation.*—The above solution-suspension was centrifuged for specified intervals of time (e.g., 15, 30, and 60 minutes). The material deposited after each time interval was removed from the tubes and placed in a weighed crucible and dried to constant weight at 125° C. Centrifugation of the same sample was continued for the additional period of time and the additional solids deposited were determined. Most of the solids deposited were collected after 15 minutes of centrifugation.

*Percent insolubility.*—To measure total amount of insoluble material in the solution/dispersion system, the liquid was centrifuged until no more solid material was deposited. The total weight of insoluble material was thus obtained and percent insolubility was calculated according to the following:

percent insolubility
$$= \frac{\text{Weight insoluble material}}{\text{Weight original polymeric material}} \times 100$$

*Ratio of polymer to silica in the insoluble particles.*—The solid material deposited during sedimentation and solubility studies was charred at 1,000° C., removing all organic residue and leaving only silica. The difference between the weights before and after charring was the weight of organic polymer attached to the silica. The ratio of weight to polymer in insoluble particles was then calculated.

*Degree of cross-linking.*—Determination of the relative amount of cross-linking introduced into 5/1 E/VA by incorporation of silica was made using the relation developed by Flory and Rehner [J. Chem. Phys. 18, 521 (1943)]. Their derivation consists of equaling the free energy change brought about by mixing polymer with solvent to the free energy change needed to extend coiled polymer molecules:

$$\left(C_0 - \frac{1}{M}\right) = \frac{[\ln(1-v_2) + v_2 + \mu v_2^2]}{2V_1\rho\left(\frac{v_0^{2/3}}{v_2^{1/3}} - \frac{2v_2}{f}\right)}$$

where:

$C_0$=apparent number of moles of cross-links added to a gram of polymer.
$M$=number-average molecular weight of polymer before cross-linking.
$\rho$=bulk density of polymer before cross-linking.
$v_0$=volume fraction of polymer in the silica-polymer mixture at time of cross-linking.
$v_2$=volume fraction of polymer in sample at equilibrium swollen state after immersion in swelling agent.
$V_1$=molar volume of swelling agent.
$f$=functionality of cross-links in the sample.
$\mu$=solvent-polymer interaction parameter.

The samples used in the swelling measurements were weighed and placed in small weighed envelopes of mesh wire. These envelopes were placed in an excess of toluene at 25±1° C. At intervals of one to three days, each was removed, blotted carefully with filter paper and weighed quickly. The measurements were continued until equilibrium conditions were obtained. The amount of material which had dissolved during this time was determined by drying the envelopes in a vacuum oven at 45° C. to constant weight. The volume fraction of polymer in the sample at equilibrium swollen state, $v_2$, was then calculated:

$$v_2 = \frac{\text{volume final dried polymer}}{\text{volume equilibrium swollen polymer}}$$

The density of polymer, obtained by water immersion at 30° C., was 0.948 g./cc.; the density of the silica used was 2.15 $V_1$, the molar volume of toluene was 107.0. Reasonable assumptions for the terms M, $\mu$ and $f$, were used and although precluding the determination of absolute values for number of cross-links, should not alter the relative values obtained on rubber-milled and sol-filled films at various silica loadings. For "normal" distribution type polymers, the number-average molecular weight is about one-half the weight-average molecular weight. The former was thus assumed to be 100,000, a value of 200,000 being found for the weight-average molecular weight of 5/1 E/VA by light-scattering. The polymer-solvent interaction $\mu$, was assumed as 0.45 and a functionality, $f$, of 4 was used.

Referring once again to FIGURE 3, which relates to an ethylene/vinyl acetate copolymer (5/1 mol ratio) reacted with various amounts of silica to form different polymer/silica reaction products, this figure also shows that the percent insoluble material in the polymer/silica products, determined in accordance with the test described above, increases as the amount of silica reacted with polymer is increased.

Figure 4:
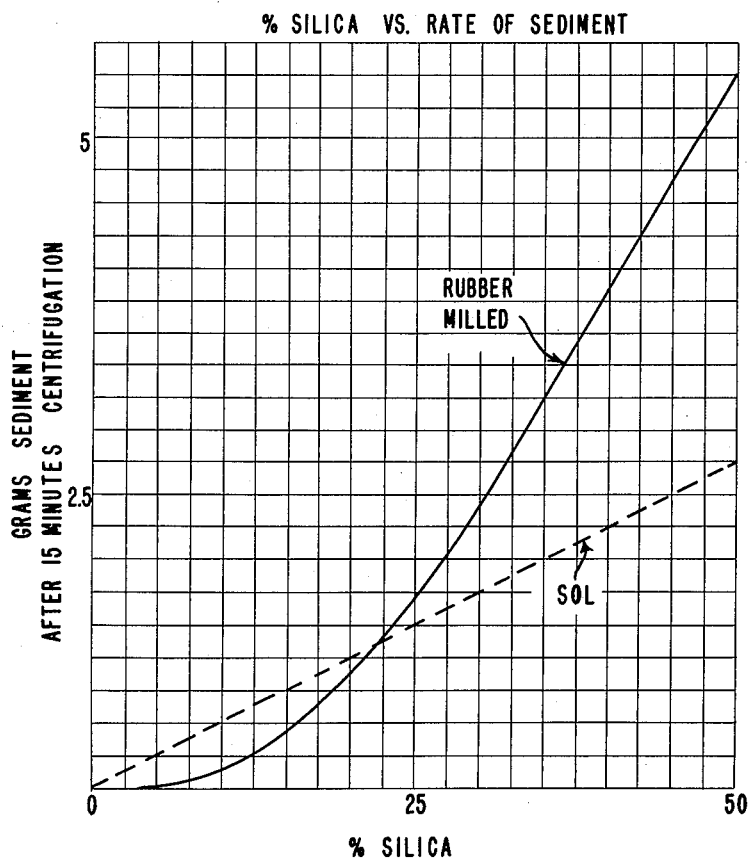

For purposes of comparison, a silica-containing polymeric film was prepared by combining a solution of an ethylene/vinyl acetate copolymer (5/1 mol ratio) in toluene with a silica sol consisting of colloidal silica dispersed in isopropanol, in accordance with U.S. Patents 2,467,339, -340, -341 and -342. The silica sol was blended with the solution of ethylene/vinyl acetate copolymer and the resulting solution/dispersion system (organosol) was doctored onto a smooth casting surface to form a film, in accordance with the teachings of the aforementioned patents. This film was then compared with a film prepared in accordance with the process of the present invention wherein an ethylene/vinyl acetate copolymer (5/1 mol ratio) was reacted with the same amount of particulate silica employed in preparing the film formed from the organosol. FIGURE 4 illustrates a comparison of the sediment versus percent silica for ethylene/vinyl acetate-silica products having the same weights of components (mol ratio E/VA is 5/1), one having been made by the process of the present invention and the other casting from an organosol. In FIGURE 4 the abscissa (percent silica) represents the weight of silica in the polymer/silica products made by the two different processes, and the ordinate (amount of sediment in grams) is the amount of material deposited after 15 minutes of cetrifugation. FIGURE 4 clearly shows that when the amount of silica in the polymer/silica product exceeds about 25%, by weight of the total composition, the total weight of solids deposited from products prepared by the present process is appreciably greater than that deposited from the film formed from organosol casting. In view of the fact that photomicrographs of both types of films indicate that the silica is uniformly dispersed throughout in the form of individual particles, and the fact that both products contained equal weights of silica, the greater amount of sediment collected in the case of products of the present invention is indicative of the fact that the individual insoluble solid particles of polymer/silica reaction product are larger than those in the sol-cast film. This is due to the fact that the polymer chains are tied together through individual silica particles to form a network, and thereby form heavier masses of polymer and silica than in the case of the film composition formed from the organosol.

The products of the present invention are further compared with those formed by casting from organosols by employing the test described as "Degree of Cross-Linking." This involves swelling samples of each of the polymeric products (5/1 E/VA-silica product of the present invention vs. a 5/1 E/VA polymer containing silica as made by organosol casting). FIGURE 5 illustrates the degree of cross-linking vs. percent silica in the case of the two products, and this plot clearly indicates the negative indication of cross-linkages in the organosol cast film as compared with an appreciable rise in the degree of cross-linkages in the present products as they contain increasingly greater amounts of silica.

To further evidence for chemical reaction between particulate silica and the polymers defined by the present invention, where the particulate silica and the polymer are combined under the conditions of elevated temperatures and compressive forces defined by this invention, alternative routes were employed to form silica-containing products made by the present invention and the techniques of the prior art. In the following examples an ethylene/vinyl acetate copolymer (5/1 mol ratio) was combined with 40%–50% by weight of particulate silica in accordance with several different techniques as described hereinafter:

*Cast.*—Ethylene/vinyl acetate copolymer (5/1 mol ratio) was dissolved in toluene (solution contained 12% solids). This solution was cast into a film by doctoring it onto a glass surface and evaporating the solvent.

*Sol-cast.*—This film was formed from an organosol as described hereinbefore. The silica sol was about a 24.8% colloidal silica solids in propanol.

*Rubber-milled.*—This film was prepared in accordance with the process of the present invention described hereinbefore by melt-pressing a rubber-milled polymer/silica reaction product.

*Sol-cast, pressed, rolled.*—A quantity of the sol-cast film was pressed between ferrotype plates at 140° C. for 10 minutes, and thereafter the pressed film was rolled between stainless steel rolls at a temperature of 38° C. and under light pressure.

*Silica ("Cab-O-Sil"), pressed, rolled.*—This film was prepared by dissolving 60 parts of the ethylene/vinyl acetate (5/1 mol ratio) copolymer in toluene to form a solution, and thereafter adding 40 parts by weight of particulate silica ("Cab-O-Sil") to form a solution-dispersion system. The system was agitated for ½ hour at 100° C., and then evaporated to dryness at 100° C. The residual white powder was heated at 150° C. for 1 hour, and thereafter melt-pressed between ferrotype plates at a temperature of 150° C. for 15 minutes. The film was then rolled lightly at 38° C. (roll temperature) to form a clear film.

The following table, Table VI, contains a tabulation of various physical properties of these films along with that of a control film containing no silica. These data indicate that an improvement in the physical properties of a sol-cast film may be made by pressing and rolling the film under conditions of elevated temperature and pressure. The greater improvement in the physical properties of Example 59 over Example 58 is believed to be essentially due to the different solvents used to form organosol systems. The propanol of the system from which the film of Example 58 was formed is known to attach itself through hydrogen bonding to reactive hydroxyl groups on another compound, in this case silanol groups; and such attachment blocks and inhibits the reaction of silanol groups with the acetoxy groups of the ethylene/vinyl acetate copolymer. On the other hand, toluene, the solvent employed in the organosol system from which the film of Example 59 was cast, is not prone to attach itself to silica by hydrogen bonding, and substantially all of the silanol groups are readily available for reaction with the acetoxy groups of the ethylene/vinyl acetate copolymer.

*Table VI*

5/1 E/VA RUBBER MILL VS. SILICA ORGANOSOL PHYSICAL PROPERTIES

| Ex. | Type | Percent SiO2 | Gage, mil | Tenacity, p.s.i. | Elongation, Percent | Modulus, p.s.i. | Tear, g./mil | Zero strength temperature, °C. |
|---|---|---|---|---|---|---|---|---|
| 55 | Cast (control) | 0 | 4.8 | 499 | 1,949 | 212 | 38 | 45 |
| 56 | Sol-cast (control) | 50 | 4.0 | 533 | 923 | 3,403 | 107 | 105 |
| 57 | Rubber mill | 50 | 2.8 | 3,954 | 240 | 8,801 | 263 | >300 |
| 58 | Sol-cast pressed, rolled | 50 | 3.8 | 1,164 | 681 | 1,520 | 166 | 105 |
| 59 | "Cab-O-Sil", pressed, rolled | 40 | 3.3 | 5,200 | 110 | 9,000 | 256 | >300 |

*Example 60.*—The polymer-silica reaction products of this invention may be calendered or rolled into the form of unsupported or supported sheets or films.

An ethylene/vinyl acetate copolymer (mol ratio of 4/1) was rubber-milled at 85° C. for 10 minutes with 50% by weight of "Cab-O-Sil," and the resulting polymer-silica reaction product was calendered onto a non-woven cotton fabric. The resulting product was suitable for use as an upholstery material.

The essential advantage of the present invention is that it provides for the preparation of new polymers capable of being formed into sheets, films, filaments, rods, tubes, coatings or similar formed structures having unique and highly useful combinations of physical properties. The variety of formed structures which may be fabricated from the new polymers of this invention are useful in a myriad of applications. Many of the saturated, linear thermoplastic film-forming polymers which may be reacted with particulate silica in accordance with the present invention are inherently weak, jelly-like materials having particularly low strength under slightly elevated temperatures. The present process provides for reacting a relatively inexpensive particulate silica with such polymers to form new polymers having a combination of surprisingly elevated and useful strength properties in film form.

The present process is highly versatile in that the products may be tailored to specific end uses by varying the amount and the type of particulate silica in the polymer/silica system. Although relatively minor amounts of silica, as low as 10%, by weight, of the total composition, may be reacted with polymer, the benefits of the present invention are realized when at least 25% of silica is reacted with polymer. In general, the overall useful range of silica concentration extends from about 25%–75%; and for many types of end uses, the preferred amount of silica is in the neighborhood of 50%. For example, in the case of silica/polymer products formed with ethylene/vinyl acetate copolymers, the preferred amounts of silica will vary with relation to the prospective end use, i.e., 30–50% silica for fabric replacement films, 40–60% of silica for upholstery applications, and 45–70% of silica for floor tiles and hard surface products. These preferred concentrations do not necessarily apply when other types of polymers are to be reacted with particulate silica. Furthermore, when other types of polymers within the scope of the present invention are combined with silica, the range of physical properties of the resulting products in film form vary within wide limits. The softer the initial polymer, the softer will be the polymer/silica products; and in the case of reacting initially stiffer polymers with silica, the resulting polymer/silica products will be relatively stiff. On the other hand, many polymers are too brittle to be useful in their unplasticized state, and such is the case of polyvinyl butyral which is widely employed as a safety glass interlayer when in a plasticized condition. By following the process of the present invention, however, unplasticized polyvinyl butyral/silica products are stiff but quite tough and therefore useful.

For special end uses, the properties of the products of this invention may be made more adaptable by stretching or drawing them in one or two directions. Polyvinyl butyral-silica films may be improved in physical properties by stretching in one or two directions.

In general, the products of this invention in the form of such structures as sheets, films, filaments, rods, tubes, coatings, and the like are useful as or for conversion into fabric replacement films in upholstery applications, wearing apparel, such as rainwear, baby pants and other nursery goods, shower curtains, draperies, inflatable toys, tablecloths, suit liners, yard goods, wall coverings, furniture covers, garment bags, card table covers, aprons, in the form of tapes for bandage material, tarpaulins, luggage covers, handbags, and the like. They may also be used for floor tiles, hard surface products in general, shoe soles, shoe heels, and as a rubber-like product which retains its properties at high temperature.

It has been found that luminescent pigments may be readily incorporated into the polymer-silica products of this invention, and the resulting products formed into luminescent sheets, films, and the like. In view of the fact that the present products are highly useful in film form without plasticizers and various types of metallic stabilizers, the luminescent pigments, such as barium, calcium and strontium sulfides impart effective luminosity to these sheets, films, and the like, when they are exposed for short periods to light. Such luminescent films are useful for wearing apparel, e.g., policemen's capes, for decorative applications, and the like.

What is claimed is:

1. A process for forming a polymeric structure which comprises intimately contacting a staturated thermoplastic organic polymer with 25%–75%, based on the weight of the saturated thermoplastic organic polymer and silica, of finely-divided, substantially non-porous particles of silica, said particles of silica having their greatest dimension within the range from 0.001 micron to about 0.1 micron, having a specific surface area of at least 100 square meters per gram and being characterized by a surface layer of hydroxyl groups, said polymer being characterized by a plurality of side groups directly attached to carbon atoms in the polymer chain, said carbon atoms being separated from each other by at least two carbon atoms in each chain, said side groups being selected from the group consisting of —OH

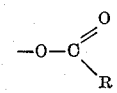

and —SO₂X wherein R is selected from the group consisting of alkyl, aryl and aralkyl radicals and X is a halogen; heating the mixture, while maintaining the components in intimate contact, to a temperature at least equal to the softening temperaure of the polymer component of the mixture for a time sufficient to bring about chemical reaction between the silica and said polymer to form a flowable mixture; forming a structure from said flowable mixture; and cooling the formed structure.

2. A process as in claim 1 wherein said side groups attached to carbon atoms in the polymer chain are hydroxyl groups.

3. A process as in claim 1 wherein said side groups attached to carbon atoms in the polymer chain are of the formula —SO₂X, wherein X is a halogen.

4. A process as in claim 1 wherein said side groups attached to carbon atoms in the polymer chain are of the formula

wherein R is selected from the group consisting of alkyl, aryl and aralkyl radicals.

5. A process as in claim 4 wherein R is an alkyl radical containing up to four carbon atoms.

6. A process as in claim 4 wherein R is methyl.

7. A polymeric material comprising a plurality of saturated organic polymeric chains linked to each other through particles of silica at a plurality of carbon atoms along each chain, said particles of silica being substantially non-porous, having their greatest dimension within the range from 0.001 micron to about 0.1 micron and having a specific surface area of at least 100 square meters per gram, said carbon atoms separated from each other by at least two carbon atoms in each chain, said linking being effected through —O— linkages on the surface of said particles of silica linked directly to said carbon atoms in the polymeric chains, said particles of silica being 25%–75%, based on the weight of said saturated organic polymeric chains and silica.

8. A film comprising a plurality of saturated organic polymeric chains linked to each other through particles of silica at a plurality of carbon atoms along each chain, said particles of silica being substantially non-porous, having their greatest dimension within the range from 0.001 micron to about 0.1 micron and having a specific surface area of at least 100 square meters per gram, said carbon atoms separated from each other by at least two carbon atoms in each chain, said linking being effected through —O— linkages on the surface of said particles of silica linked directly to said carbon atoms in the polymeric chains, said particles of silica being 25%–75%, by weight, of said film.

9. A process for preparing a polymeric structure which comprises milling a saturated thermoplastic organic polymer with 25%–75%, based on the weight of the saturated thermoplastic organic polymer and silica of finely-divided, substantially non-porous particles of silica, said particles of silica having their greatest dimension within the range from 0.001 micron to about 0.1 micron, having a specific surface area of at least 100 square meters per gram and being characterized by a surface layer of hydroxyl groups, said polymer being characterized by a plurality of side groups directly attached to carbon atoms in the polymer chain, said carbon atoms being separated from each other by at least two carbon atoms in each chain, said side groups being selected from the group consisting of —OH,

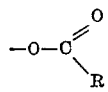

and —SO₂X wherein R is selected from the group consisting of alkyl, aryl and aralkyl radicals and X is a halogen; heating the mixture, while milling, to a temperature at least equal to the softening temperature of the polymer component of the mixture for a time sufficient to bring about chemical reaction between the silica and said polymer to form a flowable mixture; forming a structure from said flowable mixture; and cooling the formed structure.

10. A process for forming a polymeric structure which comprises milling a saturated thermoplastic organic copolymer of ethylene and vinyl acetate with 25%–75%, based on the weight of the saturated thermoplastic organic copolymer and silica, of finely-divided, substantially non-porous particles of silica, said particles of silica having their greatest dimension within the range from 0.001 micron to about 0.1 micron, having a specific surface area of at least 100 square meters per gram and being characterized by a surface layer of hydroxyl groups, said polymer being characterized by a plurality of side groups of the formula

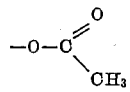

directly attached to carbon atoms in the polymer chain, said carbon atoms being separated from each other by at least two carbon atoms in each chain; heating the mixture, while milling, to a temperature at least equal to the softening temperature of the polymer component of the mixture for a time sufficient to bring about chemical reaction between the silica and said polymer to form a flowable mixture; forming a structure from said flowable mixture; and cooling the formed structure.

11. A process as in claim 10 wherein the mole ratio of ethylene to vinyl acetate is at least 1/1.

12. A process as in claim 9 wherein the saturated thermoplastic organic polymer is a copolymer of ethylene and vinyl salicylate.

13. A process as in claim 9 wherein the saturated thermoplastic organic polymer is a copolymer of vinyl chloride and vinyl acetate.

14. A process as in claim 9 wherein the saturated thermoplastic organic polymer is chlorosulfonated polyethylene.

15. A process as in claim 9 wherein the saturated thermoplastic organic polymer is polyvinyl butyral containing 17–21 weight percent vinyl alcohol.

16. A polymeric material comprising the reaction product of a saturated thermoplastic organic polymer and finely-divided, substantially non-porous particles of silica, said particles of silica having their greatest dimension within the range from 0.001 micron to about 0.1 micron, having a specific surface area of at least 100 square meters per gram and being characterized by a surface layer of hydroxyl groups, said saturated thermoplastic organic polymer being characterized by a plurality of side groups directly attached to carbon atoms in the polymer chain, said carbon atoms being separated from each other by at least two carbon atoms in each chain, said side groups being selected from the group consisting of —OH,

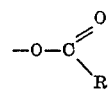

and —SO₂X wherein R is selected from the group consisting of alkyl, aryl and aralkyl radicals and X is a halogen.

17. A film comprising the reaction product of a saturated thermoplastic oragnic polymer and finely-divided, substantially non-porous particles of silica, said particles of silica having their greatest dimension within the range from 0.001 micron to about 0.1 micron, having a specific surface area of at least 100 square meters per gram and being characterized by a surface layer of hydroxyl groups, said saturated thermoplastic organic polymer being characterized by a plurality of side groups directly attached to carbon atoms in the polymer chain, said carbon atoms being separated from each other by at least two carbon atoms in each chain, said side groups being selected from the group consisting of —OH,

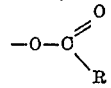

and —SO₂X wherein R is selected from the group consisting of alkyl, aryl and aralkyl radicals and X is a halogen, said particles of silica being 25%–75%, by weight, of said film.

18. A polymeric material comprising the reaction product of a saturated thermoplastic organic polymer and finely-divided, substantially non-porous particles of silica, said particles of silica having their greatest dimension within the range from 0.001 micron to about 0.1 micron, having a specific surface area of at least 100 square meters per gram and being characterized by a surface layer of hydroxyl groups, said saturated thermoplastic organic polymer being characterized by a plurality of side groups of the formula —OH directly attached to carbon atoms in the polymer chain, said carbon atoms being separated from each other by at least two carbon atoms in each chain, said particles of silica being 25%–75%, based on the weight of said saturated thermoplastic organic polymer and silica.

19. A polymeric material comprising the reaction product of a saturated thermoplastic organic polymer and finely-divided, substantially non-porous particles of silica, said particles of silica having their greatest dimension within the range from 0.001 micron to about 0.1 micron, having a specific surface area of at least 100 square meters per gram and being characterized by a surface layer of hydroxyl groups, said saturated thermoplastic organic polymer being characterized by a plurality of side groups of the formula

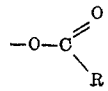

wherein R is selected from the group consisting of alkyl, aryl and aralkyl radicals directly attached to carbon atoms in the polymer chain, said carbon atoms being separated from each other by at least two carbon atoms in each chain, said particles of silica being 25%–75%, based on the weight of said saturated thermoplastic organic polymer and silica.

20. A polymeric material comprising the reaction product of a saturated thermoplastic organic polymer and finely-divided, substantially non-porous particles of silica, said particles of silica having their greatest dimension within the range from 0.001 micron to about 0.1 micron, having a specific surface area of at least 100 square meters per gram and being characterized by a surface layer of hydroxyl groups, said saturated thermoplastic organic polymer being characterized by a plurality of side groups of the formula —$SO_2X$ wherein X is a halogen directly attached to carbon atoms in the polymer chain, said carbon atoms being separated from each other by at least two carbon atoms in each chain, said particles of silica being 25%–75%, based on the weight of said saturated thermoplastic organic polymer and silica.

References Cited in the file of this patent

UNITED STATES PATENTS

| | | |
|---|---|---|
| 2,185,586 | Brooks | Jan. 2, 1940 |
| 2,517,014 | Miller et al. | Aug. 1, 1950 |
| 2,630,425 | Rodman | Mar. 3, 1953 |
| 2,657,149 | Iler | Oct. 27, 1953 |
| 2,681,327 | Brown | June 15, 1954 |
| 2,728,740 | Iler | Dec. 27, 1955 |

OTHER REFERENCES

Schmidt: "Ind. and Eng. Chem.," volume 43, No. 3, March 1951, pages 679–683.

Billmeyer: "Textbook of Polymer Chemistry" (1957), published by Interscience Publishers, pages 307–308.